United States Patent
Tong et al.

(10) Patent No.: US 6,724,719 B1
(45) Date of Patent: Apr. 20, 2004

(54) DETERMINING TRANSMIT SIGNAL POWERS OF CHANNELS IN A CDMA COMMUNICATIONS SYSTEM

(75) Inventors: Wen Tong, Ottawa (CA); Rui R. Wang, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/502,050

(22) Filed: Feb. 11, 2000

(51) Int. Cl.[7] ................................................ H04J 11/00
(52) U.S. Cl. ....................... 370/209; 370/333; 370/335; 370/342; 455/69; 455/522
(58) Field of Search ................................. 370/320, 342, 370/335, 441, 206, 208, 209, 332, 333; 375/130, 140; 455/13.4, 38.3, 522, 68, 69, 70

(56) References Cited

U.S. PATENT DOCUMENTS

| | | | | |
|---|---|---|---|---|
| 6,101,168 A | * | 8/2000 | Chen et al. | 370/228 |
| 6,167,273 A | * | 12/2000 | Mandyam | 455/450 |
| 6,418,134 B1 | * | 7/2002 | Geddes et al. | 370/342 |
| 6,473,619 B1 | * | 10/2002 | Kong et al. | 455/456 |

OTHER PUBLICATIONS

"On the Selection of Pilot to Data Ratio for Pilot Assisted Coherent CDMA Reverse Link", F. Ling, contribution to Telecommunications Industry Association, TR 45.5.4/98.01.08.03, Jan. 1998.

"Preliminary Method for Setting the Gains of the Reverse Link Walsh Channels (Rev. 3)", G. Leung et al., contribution to Telecommunications Industry Association, TR 45.5.3.1/99.01.12.17, Jan. 1999.

"Power Balance of Constituent Walsh Code Channels", W. Tong et al., contribution to Telecommunications Industry Association, TR 45. 5.3.1/99.0111.40, Jan. 1999.

"Using a Single Reverse Link Walsh Channel Gain Default Table", G. Leung, et al. Telecommunications Industry Association, TR 45.5.3.1 Feb. 1999.

* cited by examiner

Primary Examiner—Alpus H. Hsu
Assistant Examiner—Thien D Tran

(57) ABSTRACT

A plurality of data channels provide respective data rates and maximum error rates from a mobile station to a base station of a CDMA system; a pilot channel facilitates recovery of the data channels. For each data channel there is determined a channel energy to noise ratio (ENR) and a required pilot channel ENR. A maximum one of the required pilot channel ENRs is selected as an ENR for transmission of the pilot channel. A relative gain, and hence transmit signal power, for each data channel is determined from the ENR determined for the data channel and the selected maximum ENR for transmission of the pilot channel, thereby minimizing the total transmitted signal power of the mobile station. The data channel signals are spread using orthogonal Walsh codes and are combined with their determined relative gains.

10 Claims, 2 Drawing Sheets

DETERMINING TRANSMIT SIGNAL POWERS OF CHANNELS IN A CDMA COMMUNICATIONS SYSTEM

This invention relates to determining transmit signal powers of channels in a CDMA (Code Division Multiple Access) communications system, in particular so-called reverse link channels from a remote station to a base station (BS) in a cellular communications system. The remote station is typically a mobile station (MS) and is referred to herein as such, but it may alternatively have a fixed location.

BACKGROUND

CDMA communications systems currently being developed, such as those referred to as IS-2000 and wideband CDMA systems, are desired to be able to provide a plurality of data channels on the reverse link from an MS to a BS. For example, such reverse link channels may include a dedicated control channel, a fundamental channel, and a supplementary channel. Each of these channels is desired when active to provide an individual data rate and quality of service (QoS). The QoS generally corresponds to a maximum bit error rate (BER) or frame error rate (FER) for typically 20 ms frames of information on the reverse link. For example, in an IS-2000 system, the control channel C can serve for carrying reverse link control information with a data rate of 9.6 kbps and a QoS requirement corresponding to a maximum BER of $10^{-3}$, the fundamental channel F can serve for carrying voice communications with a data rate up to 9.6 kbps (Rate Set 1) or 14.4 kbps (Rate Set 2) and a QoS requirement corresponding to a maximum FER of $10^{-2}$, and the supplemental channel S can serve for carrying other data (for example a video or multi-media signal) with a data rate for example up to about 1 Mbps and a QoS requirement corresponding to a maximum BER of $10^{-6}$.

To facilitate channel estimation and coherent detection of the reverse link signal at the BS, the MS also provides on the reverse link a pilot channel P for a pilot signal on its own or time division multiplexed with other data. In the MS, the reverse link channels are orthogonally spread for example using respective Walsh codes and are then combined; the resulting signal is spread using a PN (pseudo random number) sequence for transmission on the reverse link from the MS to the BS.

In active operation of the MS, the pilot channel P is typically continuously on, and the other channels may be selectively present. In particular, there may be three configurations in which respectively only the channel F, only the channels C and F, and all of the channels C, F, and S are active with the pilot channel P.

It can be appreciated that, with simultaneous communications from multiple MSs to a BS in a cell of the system, the reverse link signal of each individual MS must be received by the BS and distinguished from noise or interference (referred to below simply as noise, for convenience) which includes the reverse link signals of all other MSs. For maximum system capacity, it is therefore very important that each MS transmit its reverse link signal at an optimum power or level, i.e. at a power which is just sufficient to permit recovery of each of its constituent data channels C, F, and/or S at its respective data rate and QoS, without contributing unduly to noise for all other MS reverse link signals. For similar reasons, it is necessary for each MS to combine its constituent channels with relative levels or gains that are optimally balanced, so that each channel has a signal level that is just sufficient for the BS to recover the channel at the respective bit rate and QoS.

To this end, it has been proposed that the MS, when it is powered on, initially determine what power of the pilot channel is required for recovery of the signal of each of the other channels C, F, and/or S individually at its respective data rate and QoS, to select as the power of the pilot channel the greatest one of the pilot channel powers thus determined, and to determine the power of each of the other channels C, F, and/or S relative to the selected power of the pilot channel. This can be done conveniently using a power balance default table, stored in the MS, for the respective configurations, data rates, and QoS requirements. The powers of the channels can be adjusted in known manner during subsequent communications between the MS and the BS.

An object of this invention is to provide an improved method of determining transmit signal powers of channels on the reverse link of a CDMA communications system.

SUMMARY OF THE INVENTION

In accordance with one aspect of the invention there is provided a method of determining relative signal powers for transmission of channels on a reverse link from a remote station to a base station of a CDMA (code division multiple access) cellular communications system, comprising the steps of: for each of a plurality of data channels for transmission, each of the data channels providing a respective data rate and a respective maximum error rate, determining a respective energy to noise ratio for the channel; for each of the plurality of data channels, determining a respective energy to noise ratio of a signal of a pilot channel required for recovering a signal of the data channel; selecting a maximum one of the respective required energy to noise ratios as an energy to noise ratio for transmission of the signal of the pilot channel; and determining a relative signal power for transmission of each of the plurality of data channels from the energy to noise ratio determined for the respective data channel and the selected maximum energy to noise ratio for transmission of the pilot channel.

The method preferably comprises the steps of spreading signals of the plurality of data channels using respective orthogonal codes, and combining the signals of the data channels with the signal of the pilot channel with relative gains dependent upon the determined relative signal powers for transmission of the respective channels.

Preferably the plurality of data channels comprise at least a fundamental channel providing a relatively low data rate for a voice signal and a supplemental channel providing a relatively high data rate and a maximum error rate less than a maximum error rate of the fundamental channel. Typically in this case the maximum energy to noise ratio selected for transmission of the signal of the pilot channel is the energy to noise ratio required for recovering the signal of the supplemental channel, and the signal power determined for transmission of the fundamental channel is less than the signal power determined for transmission of the signal of the pilot channel.

Another aspect of the invention provides a method of determining gains of signals of each of a plurality of data channels relative to a signal of a pilot channel, said signals being spread using orthogonal codes, for combining said signals for transmission from a mobile station to a base station of a CDMA (code division multiple access) communications system with an initial power sufficient for recovery of the signals of the data channels at the base station each with a respective data rate and a respective maximum error rate, comprising the steps of: (a) for each of the data channels, determining a signal bit energy to noise ratio in accordance with the maximum error rate of the data channel; (b) for each of the data channels, determining a respective channel energy to noise ratio from the determined signal bit energy to noise ratio and a signal processing gain for the data channel; (c) for each of the data channels, determining a respective pilot channel energy to noise ratio sufficient for recovery of the signal of the data channel by the base station; (d) selecting a maximum one of the respective required pilot channel energy to noise ratios as an energy to noise ratio for transmission of the pilot channel; and (e) determining relative gains for combining the signals of the data channels with the signal of the pilot channel from the respective data channel energy to noise ratio determined in step (b) and the pilot channel energy to noise ratio selected in step (d).

BRIEF DESCRIPTION OF THE DRAWINGS

The invention will be further understood from the following description by way of example with reference to the accompanying drawings, in which.

DETAILED DESCRIPTION

Figure 1:
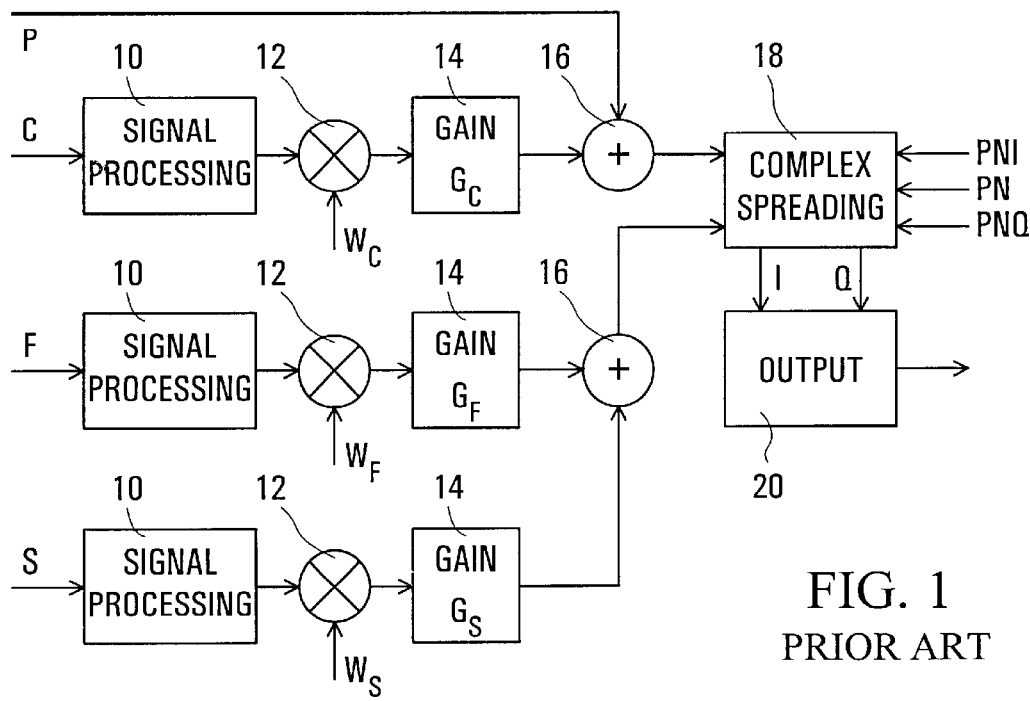
FIG. 1 is a block diagram of parts of a transmitter of a mobile station (MS) of a CDMA communications system, as is known in the art.

Referring to the drawings, FIG. 1 illustrates parts of a transmitter of an MS of a CDMA communications system, including signal processing blocks 10 for signals of control, fundamental, and supplemental data channels C, F, and S respectively. Each signal processing block 10 includes known signal processing functions, such as adding CRC (cyclic redundancy check) information and encoder tail bits, encoding, symbol and sequence repetition, and block interleaving, and provides a respective signal processing gain. The outputs of the signal processing blocks 10 are supplied to respective multipliers 12 to be multiplied, and thereby orthogonally spread, by Walsh code sequences $W_C$ (e.g. ++++----), $W_F$ (e.g. ++--), and $W_S$ (e.g. +-) respectively. The outputs of the multipliers 12 are supplied to respective gain elements 14 providing relative signal gains $G_C$, $G_F$, and $G_S$ respectively. The resulting F and S channel signals are combined in an adder 16, and the resulting C channel signal is combined with a signal of a pilot channel P in another adder 16. This pilot channel signal is a known sequence which is in effect multiplied by an all-ones Walsh code sequence (++++) and thus is orthogonal to the other channel signals, with a relative gain of one.

The outputs of the adders 16 are supplied to a complex spreading block 18 which spreads the signals in accordance with quadrature spreading sequences PNI and PNQ and a long code (PN sequence) PN to produce quadrature output signal components I and Q, which are supplied to an output stage 20 which produces an output signal for transmission on the reverse link from the MS to a base station (BS, not shown). The output stage 20 performs known functions such as baseband filtering, gain, and quadrature modulation and combining of the signals for transmission.

As explained in the background, it is desired to determine the gain provided commonly for all the channels by the output stage 20 and the relative gains provided for the respective channels by the gain elements 14 so that, for the data rates that are to be provided on the channels C, F, and/or S, the respective QoS is provided for each channel with an optimum (minimum) total transmitted signal power and an optimum power balance among the channels, with this optimization being achieved initially on activation of the MS before any subsequent adjustment of signal powers during ongoing communications between the MS and the BS. It can be appreciated that the optimum power balance, and hence relative gains, of the channels will depend not only on the configuration, i.e. which one or more of the channels C, F, and S are to be transmitted, but also on the data rate of each channel (and hence its signal processing gain in the respective block 10) and the required QoS of each channel.

In addition, this optimum power balance depends on the size of a window used in the BS for accumulating estimates of the pilot channel signal, alternatively expressed as a pilot channel filter bandwidth. This window size is limited by worst-case Doppler fading and carrier offset, and is preferably fixed in order to simplify processing the pilot channel signal in the BS. For example this window size is selected to provide a pilot channel filter bandwidth of 230 Hz.

In the following description, steps which are carried out in accordance with an embodiment of the invention are described in turn. These steps are illustrated by blocks in the flow chart in FIG. 2 of the drawings, which are referred to at appropriate points in the following description. In this description, $\{E_b/I_o\}$ refers to the ratio of signal bit energy to noise for each of the channels C, F, and S, which are referred to generically as data channels i, and $\{E_c/I_o\}$ refers to the ratio of energy to noise for the pilot channel P and for each of the other Walsh channels C, F, and S taking into account the signal processing gain $G_i$ provided by the respective block 10.

In a first step, for the chosen pilot channel filter bandwidth, the ratio $\{E_b/I_o\}_i$ is determined for each of the data channels i (i=C, F, or S) in accordance with its required QoS. This is illustrated by block 30 in FIG. 2.

Figure 2:
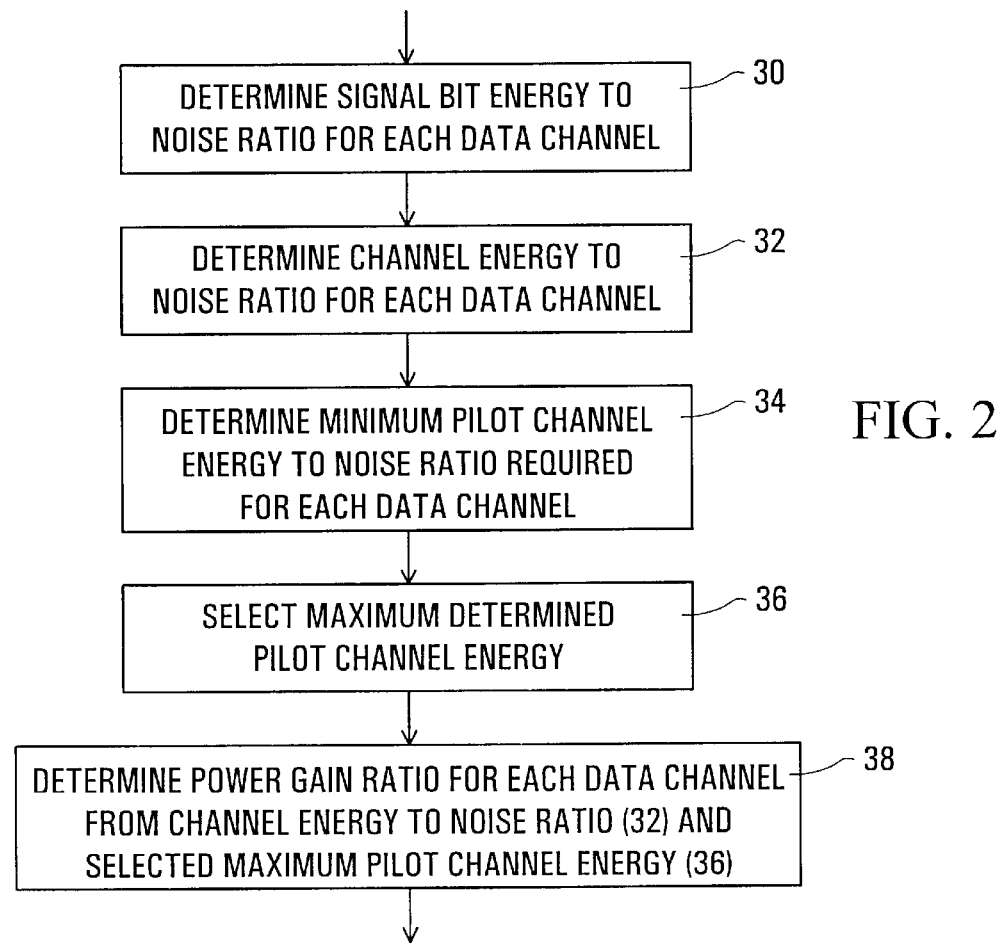
FIG. 2 is a flow chart of steps of a method in accordance with an embodiment of this invention.

In a second step represented by block 32 in FIG. 2, the ratio $\{E_c/I_o\}_i$ is determined for each of the data channels i (i=C, F, or S) from its determined ratio $\{E_b/I_o\}_i$ and its signal processing gain $G_i$ in the respective signal processing block 10, in accordance with the equation $\{E_c/I_o\}_i = \{E_b/I_o\}_i - G_i$.

In a third step represented by block 34 in FIG. 2, an optimum, i.e. minimum, ratio $\{E_c/I_o\}_P$ is determined for the pilot channel P in respect of each of the data channels i (i=C, F, or S), which is sufficient for the respective data channel i with its ratio $\{E_c/I_o\}_i$ to be recovered by the BS. Where all three data channels C, F, and S are to be transmitted, this results in three ratios $\{\{E_c/I_o\}_P\}_i$, one for each data channel i.

For example, this determination can be in accordance with the following approximate Equation (1):

$$\frac{\{E_c/I_o\}_i}{\{\{E_c/I_o\}_P\}_i} = \sqrt{\frac{(R \cdot SNR)}{2B(1 + rSNR)}} \qquad (1)$$

where B is the pilot channel filter bandwidth, R is the data rate of the channel i, r is the coding rate of the data channel, and SNR is the signal to noise ratio of the input signal to the decoder of the receiver.

Alternatively, this determination can be provided by solving an exact equation for optimum relative signal power of the pilot channel for the data channels. Due to the lengthy expression of this solution, it is presented below in the form of a table. This table represents, for each of the data channels C, F, and S, the required QoS, the consequently required signal to interference ratio (SIR), possible data rates and corresponding signal processing gains in the blocks 10, and consequent rake receiver input signal powers for the data channel and relative power of the pilot channel signal.

| Channel | QoS | Req'd SIR dB | Rate kbps | Proc. gain | Rake Rx SIR dB | Rel. Power |
|---|---|---|---|---|---|---|
| F | FER | −3.971 | 9.6 | 96 | −23.793 | 6 |
| Rate | 10⁻² | | 4.8 | 192 | −26.804 | 3 |
| Set 1 | | | 2.4 | 288 | −28.565 | 2 |
| | | | 1.2 | 576 | −31.575 | 1 |
| F | FER | −3.808 | 14.4 | 64 | −21.870 | 9.343 |
| Rate | 10⁻² | | 7.2 | 128 | −24.880 | 4.672 |
| Set 2 | | | 3.6 | 256 | −27.890 | 2.336 |
| | | | 1.8 | 512 | −30.901 | 1.168 |
| S | BER | −2.21 | 9.6 | 96 | −21.943 | 9.188 |
| | 10⁻⁶ | | 14.4 | 64 | −20.182 | 13.782 |
| | | | 19.2 | 48 | −18.933 | 18.374 |
| | | | 28.8 | 32 | −17.172 | 27.561 |
| | | | 38.4 | 24 | −15.923 | 36.745 |
| | | | 57.6 | 16 | −14.162 | 55.119 |
| | | | 76.8 | 12 | −12.912 | 73.502 |
| | | | 115.2 | 8 | −11.151 | 110.255 |
| | | | 153.6 | 6 | −9.902 | 146.994 |
| | | | 230.4 | 4 | −8.141 | 220.496 |
| | | | 460.8 | 2 | −5.131 | 440.961 |
| | | −0.771 | 307.2 | 4 | −6.792 | 300.815 |
| | | 1.09 | 921.6 | 2 | −1.921 | 923.422 |
| C | BER 10⁻³ | −4.421 | 1.2 | 192 | −27.254 | 2.705 |

Thus for the particular data rates indicated by the table, the three ratios $\{\{E_c/I_o\}_p\}_i$ referred to above can be derived from the last column of the table in the rows for the respective data rates for the data channels C, F, and S.

In a fourth step represented by block 36 in FIG. 2, a maximum one of these three ratios $\{\{E_c/I_o\}_p\}_i$, referred to below as $\{E_c/I_o\}_{Pmax}$, is selected to determine the power with which the pilot channel signal is to be transmitted. This also determines the power, relative to the power of the pilot channel signal, with which the data channel corresponding to the maximum one of the three ratios is to be transmitted.

In accordance with the prior art proposal discussed in the Background above, in which Equation (1) is used in the third step to determine the ratios $\{\{E_c/I_o\}_p\}_i$ for each data channel i, the relative power with which each other data channel is to be transmitted is then determined from Equation (1), using the selected maximum pilot channel energy to noise ratio $\{E_c/I_o\}_{Pmax}$ as the denominator on the left-hand side of Equation (1). Consequently, the relative powers of all of the data channels i are determined in accordance with Equation (1) relative to the selected maximum pilot channel energy, and the relative gains of the gain elements 14 in FIG. 1 are adjusted accordingly.

A significant disadvantage of this prior art proposal is that these other data channels (not resulting in the selected maximum pilot channel energy to noise ratio $\{E_c/I_o\}_{Pmax}$) are allocated relative powers for transmission that can be significantly greater than is actually required for recovery of these data channels each with its respective QoS, given the determined power with which the pilot channel is transmitted. Thus these other data channels are initially transmitted with powers greater than is required; this fact is not recognized in the prior art. This excessive power constitutes noise for each other MS of the communications system, thereby undesirably reducing the overall capacity (number of mobile stations) of the system.

This disadvantage of the prior art proposal is avoided in accordance with this embodiment of the invention, in which in a fifth step, represented by block 38 in FIG. 2, the relative power for transmission of each of these other data channels is determined from the channel energy to noise ratio $\{E_c/I_o\}_i$ determined in step 2 (block 32 in FIG. 2) and the energy to noise ratio $\{E_c/I_o\}_{Pmax}$ selected in step 4 (block 38 in FIG. 2) for the pilot channel. As indicated above, the power, relative to the power of the pilot channel signal, with which the data channel corresponding to the maximum one of the three ratios is to be transmitted is already determined in the same manner. Thus the relative power gain ratio $P_i$, expressed in decibels, for each data channel i, is given by the equation $P_i = \{E_c/I_o\}_{Pmax} - \{E_c/I_o\}_i$, and the relative gains of the gain elements 14 in FIG. 1 are determined accordingly.

By way of example, in a common situation in which the channel F is to be transmitted with a low data rate and the channel S is to be transmitted with a relatively high data rate, the maximum pilot channel energy to noise ratio $\{E_c/I_o\}_{Pmax}$ is determined by the high rate data channel S in terms of the SNR required at the input to a decoder of the BS for recovery of this data channel at its respective QoS. In accordance with the prior art proposal, the transmit signal power of the low rate data channel F would be scaled relative to this maximum pilot channel energy to noise ratio $\{E_c/I_o\}_{Pmax}$, and accordingly this data channel F would be initially transmitted with an excessive power of about 4.5 dB, resulting in a total energy to noise ratio increase of about 0.55 dB. This would result in subsequent substantial messaging (e.g. 18 correct messages for a power adjustment step size of 0.25 dB) from the BS to correct the power allocated to the channel F to an optimum level, a risk of the channel S failing to provide its required QoS as a result of closed loop power control operation between the BS and the MS, and a reduction in capacity of the cell equivalent to about 3 voice channels. These disadvantages are reduced or avoided by determining the relative power with which the channel F is initially transmitted in accordance with this embodiment of the invention.

Figure 3:
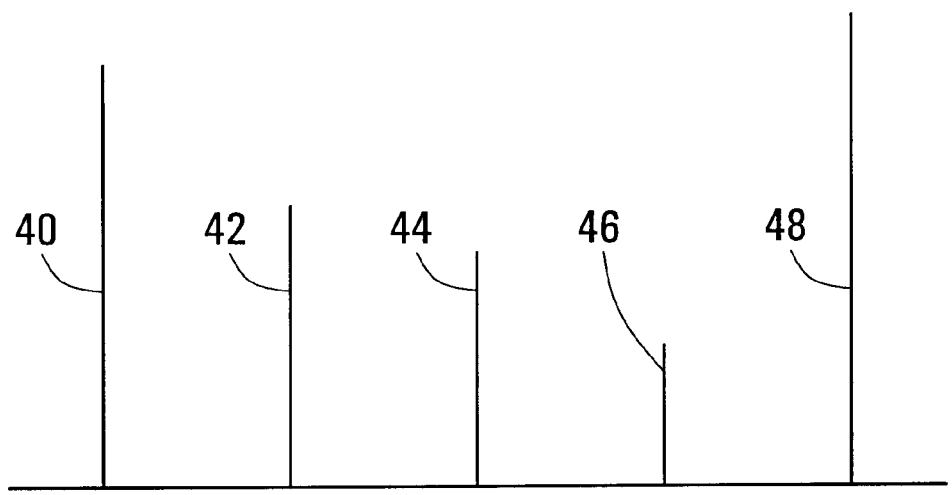
FIGS. 3 and 4 are illustrations of relative energy to noise ratios contrasting the prior art and an embodiment of the invention.
Figure 4:
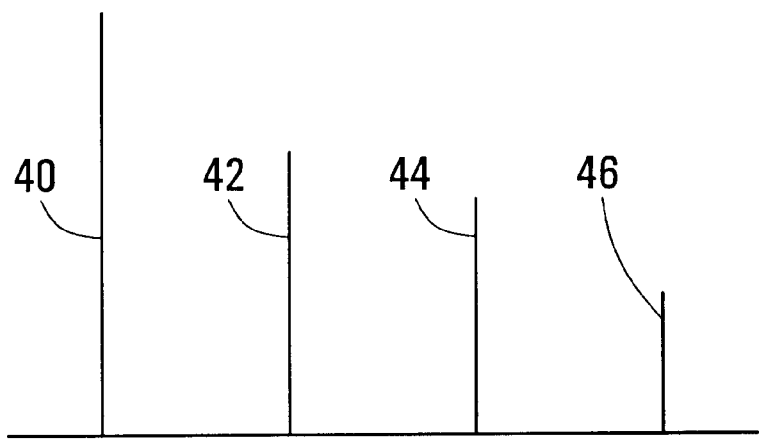

FIGS. 3 and 4 illustrate differences between the prior art and this embodiment of the invention graphically for this common situation described above, FIG. 3 relating to the prior art and FIG. 4 relating to an embodiment of the invention. In each of these figures, vertical lines illustrate relative transmit signal powers or channel energy to noise ratios for the respective components.

Referring to FIG. 3, this illustrates from left to right by respective lines a ratio $\{E_c/I_o\}_S$ determined for the supplemental channel S as described above with reference to block 32 in FIG. 2 (line 40), a corresponding required minimum pilot channel to energy noise ratio $\{\{E_c/I_o\}_P\}_S$ determined as described above with reference to block 34 in FIG. 2 (line 42), a ratio $\{E_c/I_o\}_F$ determined for the fundamental channel F as described above with reference to block 32 in FIG. 2 (line 44), a corresponding required minimum pilot channel to energy noise ratio $\{\{E_c/I_o\}_P\}_F$ determined as described above with reference to block 34 in FIG. 2 (line 46), and a resulting channel energy to noise ratio corresponding to the transmit signal power allocated to the fundamental channel F in accordance with the prior art proposal described above (line 48). The line 48 has the same ratio to the line 44 as the line 42 has to the line 46. In this case the pilot channel P, fundamental channel F, and supplemental channel S are allocated relative gains and consequently relative transmit powers represented by the lines 42, 48, and 40 respectively.

FIG. 4 relating to an embodiment of the invention illustrates the same lines 40, 42, 44, and 46 in the same manner and with the same ratios. In accordance with the above description, the pilot channel P, fundamental channel F, and supplemental channel S are allocated relative gains and consequently relative transmit powers represented by the lines 42, 44, and 40 respectively, from which it can be seen that the power allocated to the fundamental channel is greatly reduced.

Viewed alternatively, in the above example of a high rate data channel S determining the pilot channel energy to noise ratio $\{E_c/I_o\}_{Pmax}$ and a low rate data channel F, in accordance with the prior art proposal the transmit power (or relative gain $G_F$) allocated to the data channel F is greater than the transmit power (relative gain of one) allocated to the pilot channel P. In contrast, in accordance with the embodiment of this invention described above, in this situation the transmit power (or relative gain $G_F$) allocated to the data channel F can be significantly lower than the transmit power (relative gain of one) allocated to the pilot channel P.

Although as described above the pilot channel is continuously on and carries only a pilot signal, this need not be the case. For example, instead the pilot channel can carry the pilot signal and other data in respective time slots in a time division multiplexed manner, with an increase in the power allocated to the signal of the pilot channel to compensate for the time division multiplexing of this signal.

In addition, although as described above the orthogonal codes used for code division multiplexing of the signals are Walsh codes, this need not be the case and other orthogonal or pseudo-orthogonal spreading codes can instead be used.

Thus although a particular embodiment of the invention is described above by way of example, it can be appreciated that numerous changes, variations, and modifications may be made without departing from the scope of the invention as defined by the claims.

What is claimed is:

1. A method of determining relative signal powers for transmission of channels on a reverse link from a remote station to a base station of a CDMA (code division multiple access) cellular communications system, comprising the steps of:

for each of a plurality of data channels for transmission, each of the data channels providing a respective data rate and a respective maximum error rate, determining a respective energy to noise ratio for the channel;

for each of the plurality of data channels, determining a respective energy to noise ratio of a signal of a pilot channel required for recovering a signal of the data channel;

selecting a maximum one of the respective required energy to noise ratios as an energy to noise ratio for transmission of the signal of the pilot channel; and determining a relative signal power for transmission of each of the plurality of data channels from the energy to noise ratio determined for the respective data channel and the selected maximum energy to noise ratio for transmission of the signal of the pilot channel.

2. A method as claimed in claim 1 and comprising the steps of spreading signals of the plurality of data channels using respective orthogonal Walsh codes, and combining the signals of the data channels with the signal of the pilot channel with relative gains dependent upon the determined relative signal powers for transmission of the respective channels.

3. A method as claimed in claim 2 wherein the plurality of data channels comprise at least a fundamental channel providing a relatively low data rate for a voice signal and a supplemental channel providing a relatively high data rate and a maximum error rate less than a maximum error rate of the fundamental channel.

4. A method as claimed in claim 3 wherein the maximum energy to noise ratio selected for transmission of the signal of the pilot channel is the energy to noise ratio required for recovering the signal of the supplemental channel, and the signal power determined for transmission of the fundamental channel is less than the signal power determined for transmission of the signal of the pilot channel.

5. A method as claimed in claim 1 wherein the plurality of data channels comprise at least a fundamental channel providing a relatively low data rate for a voice signal and a supplemental channel providing a relatively high data rate and a maximum error rate less than a maximum error rate of the fundamental channel.

6. A method as claimed in claim 5 wherein the maximum energy to noise ratio selected for transmission of the signal of the pilot channel is the energy to noise ratio required for recovering the signal of the supplemental channel, and the signal power determined for transmission of the fundamental channel is less than the signal power determined for transmission of the signal of the pilot channel.

7. A method as claimed in claim 1 wherein the signal of the pilot channel is transmitted in a time division multiplexed manner with other data on the pilot channel.

8. A method as claimed in claim 2 wherein the signal of the pilot channel is transmitted in a time division multiplexed manner with other data on the pilot channel.

9. A method of determining gains of signals of each of a plurality of data channels relative to a signal of a pilot channel, said signals being spread using orthogonal codes, for combining said signals for transmission from a mobile station to a base station of a CDMA (code division multiple access) communications system with an initial power sufficient for recovery of the signals of the data channels at the base station each with a respective data rate and a respective maximum error rate, comprising the steps of:

(a) for each of the data channels, determining a signal bit energy to noise ratio in accordance with the maximum error rate of the data channel;

(b) for each of the data channels, determining a respective channel energy to noise ratio from the determined signal bit energy to noise ratio and a signal processing gain for the data channel;

(c) for each of the data channels, determining a respective pilot channel energy to noise ratio sufficient for recovery of the signal of the data channel by the base station;

(d) selecting a maximum one of the respective required pilot channel energy to noise ratios as an energy to noise ratio for transmission of the pilot channel; and (e) determining relative gains for combining the signals of the data channels with the signal of the pilot channel from the respective data channel energy to noise ratio determined in step (b) and the pilot channel energy to noise ratio selected in step (d).

10. A method as claimed in claim 9 wherein the data channels include a fundamental channel providing a relatively low data rate for a voice signal and a supplemental channel providing a relatively high data rate, and wherein the maximum error rate of the supplemental channel is less than the maximum error rate of the fundamental channel.

* * * * *

UNITED STATES PATENT AND TRADEMARK OFFICE
CERTIFICATE OF CORRECTION

PATENT NO.    : 6,724,719 B1
DATED         : April 20, 2004
INVENTOR(S)   : Wen Tong et al.

It is certified that error appears in the above-identified patent and that said Letters Patent is hereby corrected as shown below:

Title page,
Item [30], Foreign Application Priority Data, insert -- Canadian Patent Application Serial No. 2,262,315 filed on February 19, 1999. --

Signed and Sealed this

First Day of February, 2005

JON W. DUDAS
*Director of the United States Patent and Trademark Office*